US011957214B2

United States Patent
Bessho et al.

(10) Patent No.: US 11,957,214 B2
(45) Date of Patent: Apr. 16, 2024

(54) SHOE, METHOD FOR PRODUCING SHOE, AND METHOD FOR PRODUCING SHOE UPPER

(71) Applicant: ASICS CORPORATION, Kobe (JP)

(72) Inventors: Ayu Bessho, Kobe (JP); Satoru Abe, Kobe (JP); Norihiko Taniguchi, Kobe (JP)

(73) Assignee: ASICS CORPORATION, Kobe (JP)

( * ) Notice: Subject to any disclaimer, the term of this patent is extended or adjusted under 35 U.S.C. 154(b) by 546 days.

(21) Appl. No.: 16/912,900

(22) Filed: Jun. 26, 2020

(65) Prior Publication Data

US 2021/0037913 A1 Feb. 11, 2021

(30) Foreign Application Priority Data

Aug. 6, 2019 (JP) .................. 2019-144402
Dec. 11, 2019 (JP) .................. 2019-223779

(51) Int. Cl.
*A43B 9/02* (2006.01)
*A43B 23/02* (2006.01)
(Continued)

(52) U.S. Cl.
CPC .............. *A43B 9/02* (2013.01); *A43B 23/025* (2013.01); *A43B 23/042* (2013.01); *B32B 5/022* (2013.01);
(Continued)

(58) Field of Classification Search
CPC ............. Y10T 442/30; Y10T 442/3472; Y10T 442/348; Y10T 442/3504; Y10T 442/3512;
(Continued)

(56) References Cited

U.S. PATENT DOCUMENTS 2,435,797 A * 2/1948 Reed ................... A43B 23/0215
36/9 R
3,570,085 A * 3/1971 Heinemann ............ D04H 1/498
28/112
(Continued)

FOREIGN PATENT DOCUMENTS

CN 1625992 A 6/2005
DE 10 2010 011356 A1 7/2011
(Continued)

OTHER PUBLICATIONS

Machine translation (Espacenet) of JP 2017-133114 A. Translated Jan. 14, 2023. (Year: 2023).*

(Continued)

*Primary Examiner* — Maria V Ewald
*Assistant Examiner* — Ethan A. Utt
(74) *Attorney, Agent, or Firm* — Studebaker & Brackett PC

(57) ABSTRACT

An object of the present invention is to provide a shoe including an upper that is easily conformed to a shape of a last when it is shaped. The shoe includes an upper made of a fiber sheet that includes: a first layer made of knitted fabric or woven fabric that includes yarns having a heat shrinkability and has inner gaps; and a second layer layered on the first layer and made of nonwoven fabric, knitted fabric or woven fabric, and being integrated with the first layer by needle punching.

10 Claims, 22 Drawing Sheets

(51) Int. Cl.
*A43B 23/04* (2006.01)
*B32B 5/02* (2006.01)
*B32B 5/26* (2006.01)
*B32B 7/09* (2019.01)
*B32B 37/02* (2006.01)
*B32B 38/00* (2006.01)
*B32B 7/02* (2019.01)

(52) U.S. Cl.
CPC ............ *B32B 5/024* (2013.01); *B32B 5/026* (2013.01); *B32B 5/26* (2013.01); *B32B 7/09* (2019.01); *B32B 37/02* (2013.01); *B32B 38/0004* (2013.01); *B32B 38/0036* (2013.01); *B32B 2038/008* (2013.01); *B32B 2262/0261* (2013.01); *B32B 2262/0276* (2013.01); *B32B 2274/00* (2013.01); *B32B 2307/736* (2013.01); *B32B 2437/02* (2013.01)

(58) Field of Classification Search
CPC ........... Y10T 442/352; Y10T 442/3528; Y10T 442/3537; Y10T 442/3602; Y10T 442/3707; Y10T 442/3724; Y10T 442/374; Y10T 442/3976; Y10T 442/3992; Y10T 442/40; Y10T 442/488; Y10T 442/494; Y10T 442/60; Y10T 442/659; Y10T 442/666; Y10T 442/667; Y10T 442/696; B32B 5/00; B32B 5/22; B32B 5/24; B32B 5/26; B32B 5/262; B32B 5/263; B32B 5/265; B32B 5/266; B32B 5/275; B32B 5/277; B32B 5/279; B32B 5/2795; B32B 7/00; B32B 7/04; B32B 7/08; B32B 7/09; B32B 2305/10; B32B 2305/18; B32B 2305/182; B32B 2305/186; B32B 2305/188; B32B 2437/00; B32B 2437/02; D03D 1/00; D03D 11/00; D03D 15/00; D03D 15/20; D03D 15/50; D03D 15/567; D04B 1/00; D04B 1/14; D04B 1/22; D04B 1/24; D04B 21/00; D04B 21/20; D04B 21/207; D04H 1/00; D04H 3/00; A43B 1/00; A43B 1/02; A43B 1/028; A43B 23/00; A43B 23/02; A43B 23/0205; A43B 23/0235; A43B 23/0245; A43B 23/026
USPC ....... 442/181, 239, 240, 243–247, 255, 268, 442/270–272, 274, 301, 303, 304, 318, 442/319, 327, 381, 387, 388, 414; 428/FOR. 105, FOR. 106, FOR. 107, 428/FOR. 108; 36/83, 84, 45

See application file for complete search history.

(56) References Cited

U.S. PATENT DOCUMENTS

| | | | | |
|---|---|---|---|---|
| 4,197,343 A | * | 4/1980 | Forsythe | D06N 3/0013 442/370 |
| 2002/0012784 A1 | * | 1/2002 | Norton | A43B 5/002 428/304.4 |
| 2002/0071946 A1 | | 6/2002 | Norton et al. | |
| 2010/0199520 A1 | | 8/2010 | Dua et al. | |
| 2015/0101133 A1 | | 4/2015 | Manz et al. | |
| 2015/0107307 A1 | | 4/2015 | Kosui et al. | |
| 2017/0245599 A1 | | 8/2017 | Manz et al. | |
| 2018/0103724 A1 | * | 4/2018 | Ho | D05B 55/00 |
| 2018/0153265 A1 | | 6/2018 | Jeandin et al. | |
| 2018/0169963 A1 | | 6/2018 | Dua et al. | |
| 2018/0295945 A1 | | 10/2018 | Manz et al. | |
| 2018/0368524 A1 | * | 12/2018 | Taniguchi | A43B 23/0275 |
| 2019/0078245 A1 | | 3/2019 | Dua et al. | |
| 2019/0208862 A1 | | 7/2019 | Poegl et al. | |
| 2019/0216174 A1 | | 7/2019 | O'Haire et al. | |

FOREIGN PATENT DOCUMENTS

| | | | | |
|---|---|---|---|---|
| EP | 2805638 A1 | | 11/2014 | |
| EP | 2862467 A1 | | 4/2015 | |
| EP | 3508628 A1 | | 7/2019 | |
| JP | 2002-537878 A | | 11/2002 | |
| JP | 2012-057290 A | | 3/2012 | |
| JP | WO2013/108506 A1 | | 5/2015 | |
| JP | 2017133114 A | * | 8/2017 | |
| JP | 2018-089380 A | | 6/2018 | |
| WO | 00/51458 A1 | | 9/2000 | |
| WO | 2016/145002 A1 | | 9/2016 | |
| WO | 2017/115806 A1 | | 7/2017 | |
| WO | WO-2017115805 A1 | * | 7/2017 | A43B 1/04 |
| WO | 2018/144118 A1 | | 8/2018 | |

OTHER PUBLICATIONS

An Office Action; "Notice of Reasons for Refusal", mailed by the Japanese Patent Office dated Jul. 2, 2021, which corresponds to Japanese Patent Application No. 2019-144402 and is related to U.S. Appl. No. 16/912,900; with English language translation.
An Office Action; "Notice of Reasons for Refusal", mailed by the Japanese Patent Office dated Jul. 9, 2021, which corresponds to Japanese Patent Application No. 2019-223779 and is related to U.S. Appl. No. 16/912,900; with English language translation.
The extended European search report issued by the European Patent Office dated Mar. 18, 2021, which corresponds to European Patent Application No. 20182728.4-1005 and is related to U.S. Appl. No. 16/912,900.
The partial European search report issued by the European Patent Office dated Dec. 16, 2020, which corresponds to European Patent Application No. 20182728.4-1011 and is related to U.S. Appl. No. 16/912,900.
An Office Action mailed by China National Intellectual Property Administration dated Dec. 23, 2022, which corresponds to Chinese Patent Application No. 202010523638.9 and is related to U.S. Appl. No. 16/912,900; with English language translation.
Communication pursuant to Article 94(3) EPC issued by the European Patent Office dated Dec. 5, 2022, which corresponds to European Patent Application No. 20182728.4-1015 and is related to U.S. Appl. No. 16/912,900.
An Office Action mailed by China National Intellectual Property Administration dated Jun. 3, 2023, which corresponds to Chinese Patent Application No. 202010523638.9 and is related to U.S. Appl. No. 16/912,900; with English language translation.
An Office Action mailed by China National Intellectual Property Administration dated Sep. 13, 2023, which corresponds to Chinese Patent Application No. 202010523638.9 and is related to U.S. Appl. No. 16/912,900; with English translation.

* cited by examiner

SHOE, METHOD FOR PRODUCING SHOE, AND METHOD FOR PRODUCING SHOE UPPER

CROSS REFERENCE TO RELATED APPLICATION

This application claims priority to Japanese Patent Application No. 2019-144402, filed Aug. 6, 2019, and Japanese Patent Application No. 2019-223779, filed Dec. 11, 2019, the disclosures of which are incorporated herein by reference in its entirety.

FIELD

The present invention relates to a shoe including a fabric upper, a method for producing a shoe, and a method for producing a shoe upper.

BACKGROUND

The specification of US 2018/103724 A and the specification of US 2019/078245 A disclose a shoe including a fabric (specifically, nonwoven fabric).

In this regard, when a shoe is produced, a last (shoe last), on which a fabric for forming an upper is placed, is used to, for example, form the upper into a certain shape.

When an upper is shaped, it is important to conform the upper to a shape of a last. Specifically, in the case where the last has a shape taken from the shape of a foot of an ordering person, conforming the upper to the shape of the last is important in making the last well conform to the shape of the foot of the ordering person and thereby applying such a last for customization. For the last for mass produced shoes, conforming the upper to the shape of the last is important in eliminating variation in shape of the mass produced shoes. Regarding these important aspects, for example, if the upper is shaped with a gap relative to the surface of the last on a lateral side of the foot, the shoe would lack the ability of holding the foot of the wearer since the foot moves toward the lateral side during the wearing of the shoe. The thus caused gap may be filled with stuffing or the like, but the feeling of wearing may be deteriorated.

Here, none of the aforementioned literatures mentions the relationship between the shaping of the upper and the last.

SUMMARY

Therefore, an object of the present invention is to provide a shoe including an upper that is easily conformed to the shape of the last when it is shaped, a method for producing a shoe, and a method for producing a shoe upper.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention is a shoe including an upper made of a fiber sheet that includes: a first layer made of knitted fabric or woven fabric, the knitted fabric or woven fabric including yarns having a heat shrinkability and inner gaps; and a second layer layered on the first layer and made of nonwoven fabric, knitted fabric or woven fabric, and being integrated with the first layer by needle punching.

The present invention is a method for producing a shoe including an upper that includes: a first layer made of knitted fabric or woven fabric, the knitted fabric or woven fabric including yarns having a heat shrinkability and inner gaps; and a second layer layered on the first layer and made of nonwoven fabric, knitted fabric or woven fabric, the method including: cutting the first layer and the second layer into a certain size; making the first layer and the second layer overlap one another and performing needle punching on the first and second layers to form a fiber sheet; preparing an unshaped upper by sewing the fiber sheet to have a shape corresponding to the upper, and placing the unshaped upper on a last; and deforming the unshaped upper to conform the unshaped upper to a shape of the last by heating to produce a shaped upper.

The present invention is a method for producing a shoe upper including: integrating a first layer and a second layer, the first layer being made of knitted fabric or woven fabric, the knitted fabric or woven fabric including yarns having a heat shrinkability and inner gaps, and the second layer being layered on the first layer and made of knitted fabric or woven fabric, the integrating including making the first layer and the second layer overlap one another; and performing needle punching on the first layer and the second layer that overlap one another, to produce a fiber sheet, wherein a needle used for the needle punching is pressed into the first layer and the second layer in a direction extending from one of the first and second layers, which is inwardly arranged, to an other of the first and second layer, which is outwardly arranged, to produce the shoe upper.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
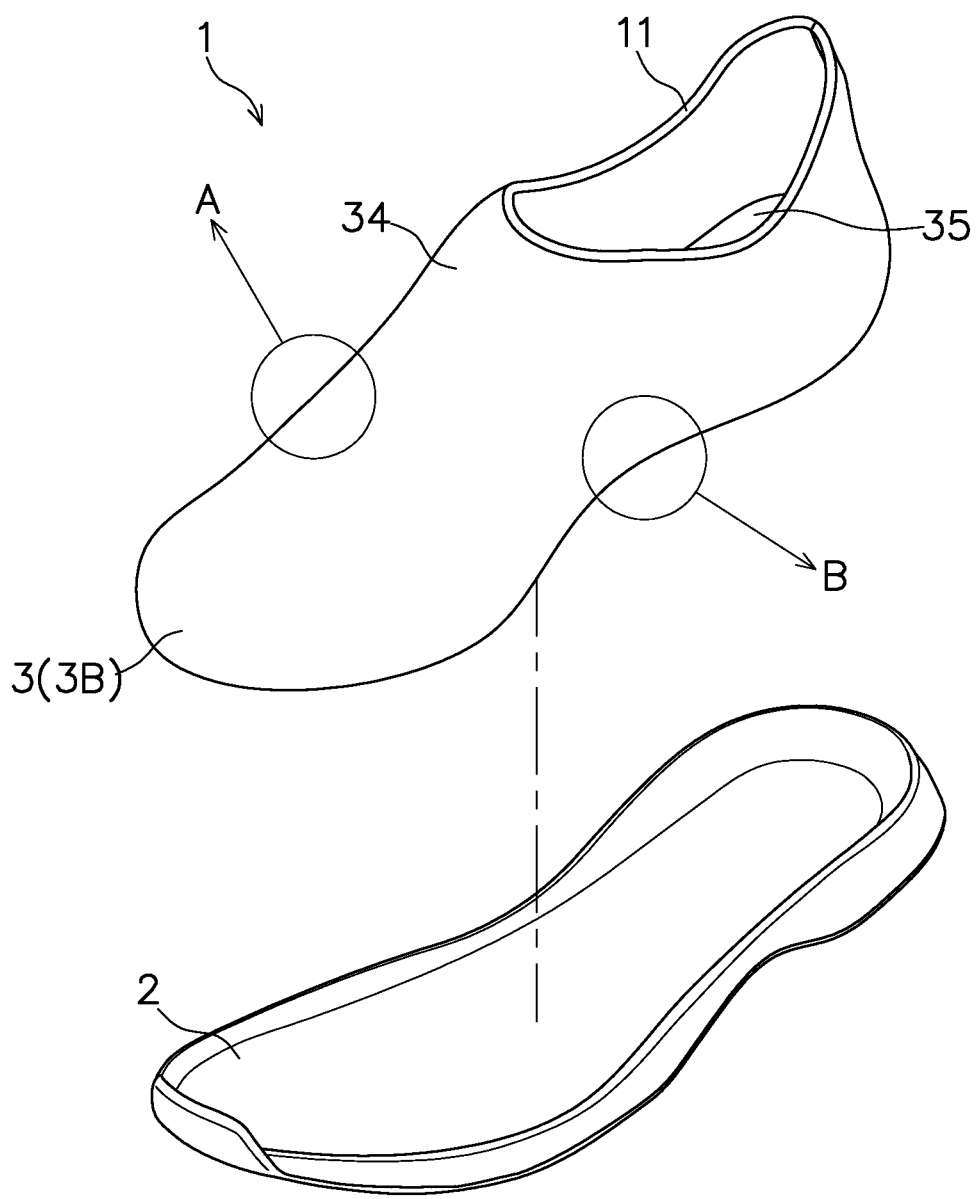
FIG. 1 is an exploded perspective view of a sole and an upper of a shoe according to a first embodiment of the present invention.
Figure 2A:
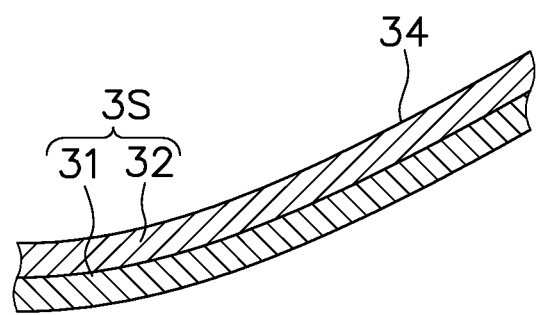
FIG. 2A is a cross-sectional view showing an example of a layer structure of a body portion of the upper in a portion surrounded by circle A in FIG. 1.
Figure 3:
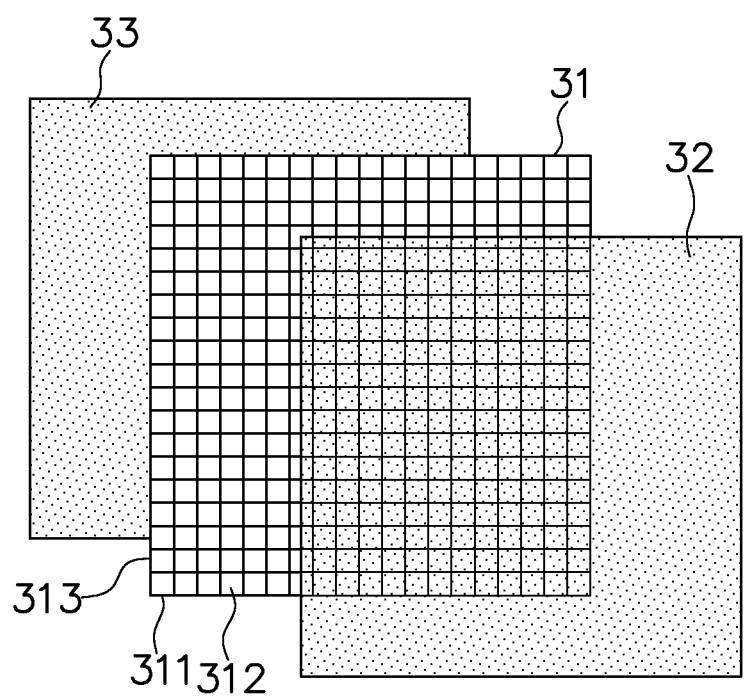
FIG. 3 is a schematic view showing a state in which a first layer made of woven fabric is sandwiched between a second layer and a third layer each made of nonwoven fabric in the first embodiment.

The present invention will be described by way of the first embodiment with reference to the drawings. Each of the right and left shoes 1 of this embodiment mainly includes a sole 2 and an upper 3, and the upper 3 is attached to the sole 2 as shown in FIG. 1. The upper 3 has an at least two layer structure, and includes, as shown in FIG. 2A and FIG. 3, a first layer 31 having a sheet shape and a second layer 32 having a sheet shape layered on the first layer 31. The upper 3 in the process of the production (before or after the upper 3 is given a shape) may be also referred to as an unshaped upper 3A or a shaped upper 3B for identification of separate states.

The first layer 31 includes yarns 311 having a heat shrinkability. The first layer 31 is made of knitted fabric or woven fabric having inner gaps 312. The knitting method of the knitted fabric is not specifically limited, but may be raschel knitting, tricot knitting, flat knitting, or rib knitting, for example. The weaving method of the woven fabric is not also specifically limited but may be plain-weaving or twill-weaving, for example.

The second layer 32 is made of nonwoven fabric. The nonwoven fabric may include, for example, polyester fibers. Since the fibers of the second layer 32 are entangled, the woven fabric of the second layer 32 does not have inner gaps corresponding to the inner gaps 312 of the first layer 31.

The first layer 31 of the upper 3 is arranged inside the second layer 32 (on the side close to the foot of the wearer during the wearing, and on the lower side in FIG. 2A). That is, the first layer 31 is an inner layer and the second layer 32 is an outer layer.

Here, the "inner gaps" are spaces each existing between fibers forming the knitted fabric or the woven fabric or between the rows of the fibers such as yarns. Generally, when the fibers of the knitted fabric or the woven fabric are arranged to extend in the plane direction, the inner gaps are spaces extending through in the normal direction of the plane surface or spaces divided in the plane direction. When adjacent intersections of fibers, each intersection having fibers intersecting with each other, are arranged with a distance from each other, each space surrounded by a plurality of intersections of fibers is defined as an inner gap. Meanwhile, when fusible yarns are used as described later, the intersections of fibers after being fused by thermoforming of the upper 3 (the unshaped upper 3A) are brought into a fixed state in which the fibers (the yarns) intersecting with each other are fixed. Examples of the "inner gaps" include openings of a mesh (see the inner gaps 312 defined by the wefts 311 and the warps 313 in a second fabric sheet of the overlapping sheets shown in FIG. 3) or seam openings of the fabric. In this embodiment, the distance between each two adjacent intersections of fibers is set to be 1 to 5 mm. Alternatively, the gap ratio in the plane direction of the knitted fabric or the woven fabric is set to be 15 to 30%. The inner gaps can be set to satisfy either one of the two conditions.

By providing the inner gaps 312 in the first layer 31, the spaces, that is, the inner gaps 312 absorbs the deformation (the shrinkage) of the yarns 311 having a heat sharinkability and the movement of the intersecting yarns 313 caused by the deformation. Thus, the spaces as the inner gaps 312 do not restrict the deformation of the first layer 31 by the yarns 311 having a heat shrinkability. Therefore, the first layer 31 can be deformed as designed, and thus the conditions (the heating temperature and the heating time) for the heat shrinkage can be easily set.

Figure 4A:
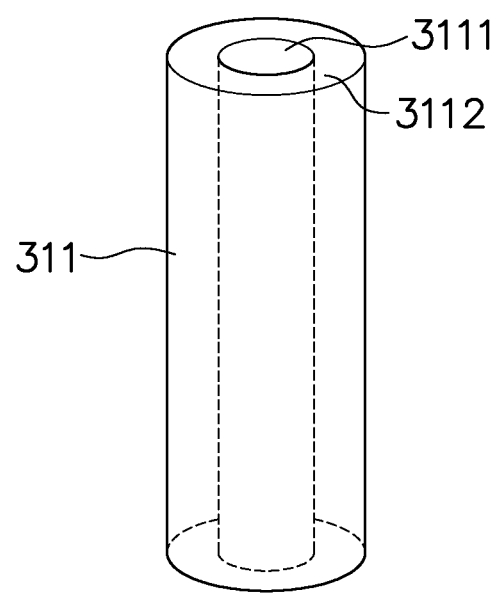
FIG. 4A is a perspective view schematically showing a structure of a yarn made of a core-sheath material in the first embodiment and the second embodiment.

The yarns 311 having a heat shrinkability included in the first layer 31 may be made of a core-sheath material that is formed by integrating a core 3111 (inner circumference part) with a sheath 3112 (outer circumference part) as schematically shown in FIG. 4A. The yarns 311 are fusible yarns that are fused together by heating, and the core 3111 and the sheath 3112 have different fusion points. The sheath 3112 has a lower fusion point than that of the core 3111 in the yarns 311. Thus, it is possible to shrink the entirety of the yarns 311, while fusing only the sheaths 3112 therein, by heating the unshaped upper 3A when the upper 3 is shaped. Thereby, both of the shape retaining action by the sheath 3112 and the elastic action by the core 3111 can be simultaneously provided. As the yarns 311 having a heat shrinkability, for example, yarns including polyester resin can be used. More specifically, a core-sheath material made of polyester thermoplastic elastomer, or a core-sheath material including the core 3111 made of polyester thermoplastic elastomer and the sheath 3112 made of polyamide thermoplastic elastomer can be used.

Figure 4B:
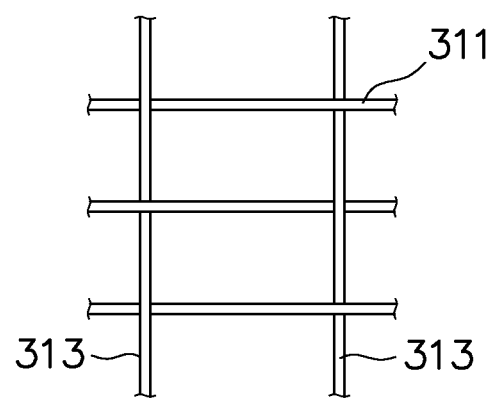
FIG. 4B is a schematic view showing the original state of woven fabric in the first embodiment and the second embodiment.
Figure 4C:
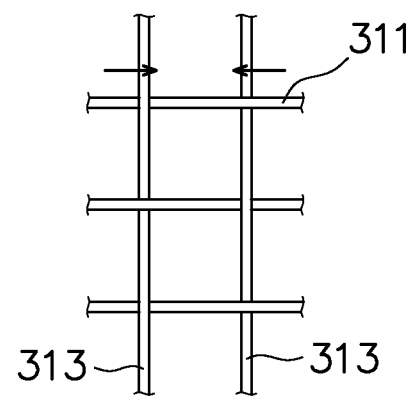
FIG. 4C is a schematic view showing a state in which wefts are shrunk from the state of FIG. 4B in the first embodiment and the second embodiment.
Figure 4D:
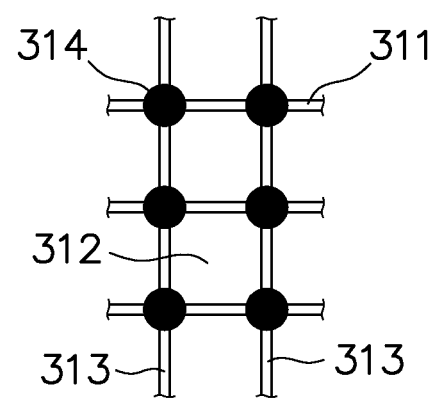
FIG. 4D is a schematic view showing a state in which warps and wefts are fused with each other in the first embodiment and the second embodiment.

The first layer 31 can be formed of woven fabric in which either warps or wefts are the yarns 311 having a heat shrinkability, or knitted fabric in which 10% or more of the entire yarns 311 forming the knitted fabric is composed of the yarns 311 having a heat shrinkability. In the woven fabric, the yarns 311 having a heat shrinkability (warps or wefts) are arranged along the width direction Y of the upper 3 (see FIG. 1). At the time of filing the present application, it is (technically) common that the yarns 311 having a heat shrinkability are used as wefts. FIG. 4B shows a configuration of woven fabric of the first layer 31 in the case where the yarns 311 having a heat shrinkability are used as wefts. According to this configuration, the yarns 311 are shrinked in the longitudinal direction by heating the first layer 31 as shown in FIG. 4C (that is, the shrinkage in the direction represented by the arrows causes the distance between the adjacent two warps 313, 313 to be shortened). The sheaths 3112 of the yarns 311 made of the core-sheath material are fused and fixedly attached to the warps 313 (at fixing points 314 shown as black circles in FIG. 4D). The first layer 31 is thus deformed. By utilizing this deformation, the upper 3 can be appropriately shaped to have a desired shape, specifically, to conform to the shape of the last (shoe last) 4.

Figure 5A:
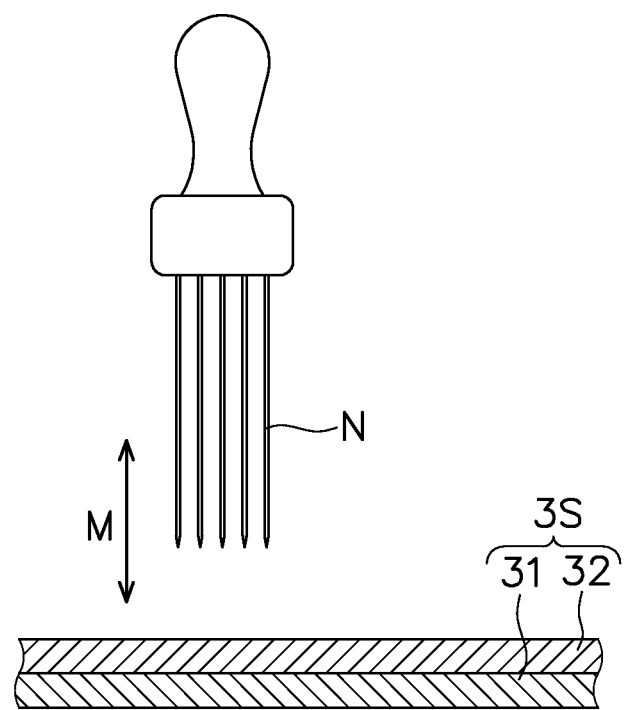
FIG. 5A is a schematic view showing a needle punching in the first embodiment.

As shown in FIG. 5A, a needling punching machine having one needle or a plurality of needles is made to reciprocate in the direction M shown in FIG. 5A to thereby reciprocate the needle or the plurality of needles to repeatedly punch them into the first layer 31 and the second layer 32 in a layered state so that the first layer 31 and the second layer 32 are integrated into a fiber sheet 3S. According to the configuration of thus integrating the separate layers, that is, the first layer 31 and the second layer 32 into the fiber sheet 3S, the design flexibility for the fiber sheet 3S can be enhanced by, for example, using different colors in combination for the first layer 31 and the second layer 32, selecting the position to be subjected to the needle punching, or the like. The fiber sheet 3S before it is sewn to have a shape of the unshaped upper 3A corresponding to the upper 3 is formed into, for example, a sheet shape or a bag shape. The "bag shape" is a shape having an opening at a position corresponding to the wearing opening 11 of the upper 3 shown in FIG. 1.

The fiber sheet 3S includes the first layer 31 including the yarns 311 having a heat shrinkability, and the first layer 31 includes the inner gaps 312. With this configuration of the fiber sheet 3S, the fiber sheet 3S that forms the upper 3 is easily deformed when it receives the heat at the time of shaping (thermoforming) the upper 3 by heating. Thus, the fiber sheet 3S is easily conformed to the shape (three-dimensional shape) of the last 4. Further, the first layer 31 and the second layer 32 can be securely integrated by the needle punching, which is shown as an example in FIG. 5A.

Because the upper 3 can be easily conformed to the shape of the last 4, the upper 3 is not given such a shape as to cause a gap relative to the surface of the last on the lateral side of the foot. Thus, the foot of the wearer is less likely to move during the wearing of the shoe and thereby the upper 3 provides excellent holding properties. Further, there is no need to fill the caused gap with stuffing or fitting, and thus the feeling of wearing is good.

Further, the first layer 31 including the yarns 311 having a heat shrinkability is arranged inside the second layer 32 and thus located inside the fiber sheet 3S, which is close to the surface of the last 4 when the fiber sheet 3S is placed on the last 4. Thus, when the thermoforming is performed after placing the fiber sheet 3S on the last 4, the fiber sheet 3S can be more easily conformed to the last 4 since the first layer 31 is located close to the last 4 than the configuration where the first layer 31 is not arranged inside the second layer 32.

The description herein is given by taking, for example, the case where the first layer 31 is arranged inside the second layer 32. However, the inside and outside relationship between the layers is not limited thereto and may be reversed. That is, the first layer 31 may be arranged outside the second layer 32 (see the second embodiment).

Figure 5B:
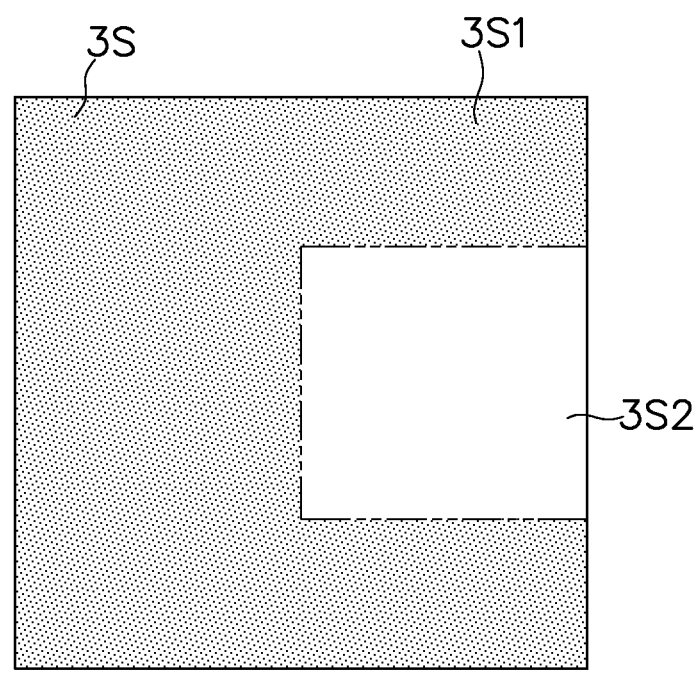
FIG. 5B is a plan view showing a fiber sheet in which a needle punched part and a gap forming part not subjected to the needle punching in the first embodiment and the second embodiment.

As shown in FIG. 5b, the fiber sheet 3S can include a needle-punched part 3S1 and a gap forming part 3S2 not subjected to the needle punching (a part indicated by two-dotted chain lines). In the gap forming part 3S2, the first layer 31 and the second layer 32 are not integrated together so that a gap (a space) can be formed between the first layer 31 and the second layer 32. A cushion material (bundle of yarns, cotton, or foam material) or a reinforcement material can be inserted in the gap (the space) of the gap forming part 3S2. The cushion material is inserted through, for example, a position corresponding to the wearing opening or a position corresponding to the shoe tongue of the shoe 1. The reinforcement material is inserted through, for example, a position corresponding to the eyelet portion, a position corresponding to the toe, or a position corresponding to the heel of the shoe 1. Thereby, desired properties can be imparted to the gap forming part 3S2. However, nothing can be inserted in the gap forming part 3S2. The characteristics depending on the characteristics of the material to be inserted in the gap forming part 3S2 can be imparted to the fiber sheet 3S. The heat shrinkage amount when the fiber sheet 3S is heated can be adjusted by the material to be inserted. When the reinforcement material is formed of a thermoset resin, the reinforcement material can be formed to conform to the shape of the last 4. Contrarily, in the case where the reinforcement material does not need to be conformed to the last 4, the reinforcement material can be selected from materials that are not deformed at a thermoforming temperature, or the reinforcement material can be inserted in the gap forming part 3S2 after the thermoforming of the upper 3. By thus providing the needle-punched part 3S1 and the gap forming part 3S2 in the fiber sheet 3S, properties to be achieved in each region of the upper 3 can be easily controlled and thus desired properties can be imparted to each region. Further, the properties of the fiber sheet 3S can be adjusted by setting the forming area or the shape of each of the needle-punched part 3S1 and the gap forming part 3S2 in the fiber sheet 3S.

Figure 2B:
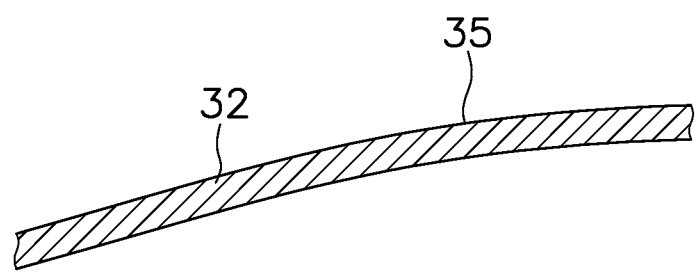
FIG. 2B is a cross-sectional view showing an example of a layer structure of a bottom portion of the upper in a portion surrounded by circle B in FIG. 1.
Figure 2C:
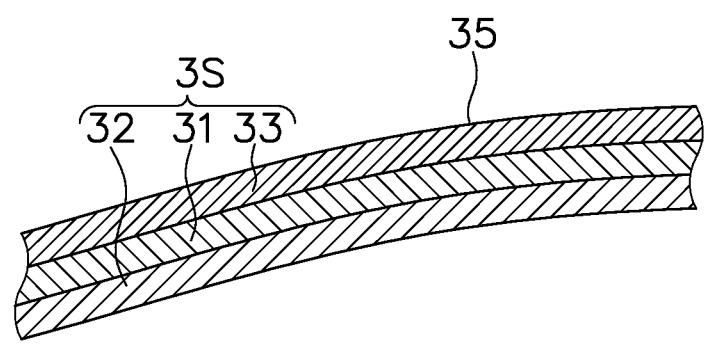
FIG. 2C is a cross-sectional view showing another example of a layer structure of the bottom portion of the upper in a portion corresponding to the portion surrounded by circle B in FIG. 1.

As shown in FIG. 2C and FIG. 3, the fiber sheet 3S can have a three layer structure further including a third layer 33 made of non-woven fabric and arranged inside the first layer 31. Regarding the third layer 33 in this case, the first layer 31 is subjected to the needle punching to thereby enable integration of the three layers, namely the first layer 31, the second layer 32, and the third layer 33. By thus providing the third layer 33, desired properties can be additionally imparted to the produced shoe 1 by setting the material and the layer thickness of the third layer 33. The third layer 33 can be entirely or partly provided on the second layer 32. In the case where the third layer 33 is partly provided, the third layer 33 can be used, for example, to reinforce a peripheral edge of a wearing opening 11 through which the wearer places the foot into and out of the shoe, or to reinforce a part for installing an eyelet.

The upper 3 can include a body portion 34 located on the upper side in the vertical direction Z (see FIG. 1) after the fiber sheet 3S is sewn, and a bottom portion 35 continuous with the lower peripheral end of the body portion 34. The upper 3 can include only the body portion 34, while not including the bottom pat 35. Further, the bottom portion 35 that has been made can be removed later (separated from the body portion 34) as described later.

Figure 6:
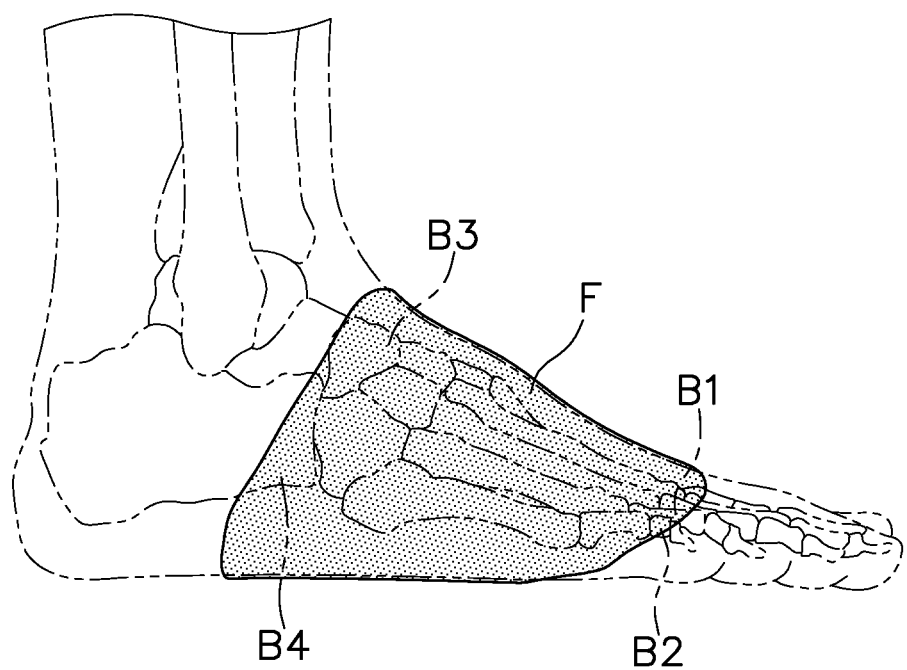
FIG. 6 is a side view showing a relationship between a forefoot portion (shown by solid lines) and a structure of human foot anatomy (shown by two-dot chain lines) in the first embodiment and the second embodiment.

The fiber sheet 3S can be included in at least a forefoot portion F of the body portion 34. Herein, the "forefoot portion" is intended to be a portion in front of the ankle of the human (wearer's) foot anatomy as encircled in FIG. 6, that is, an area from the proximal phalanx B1 of the toes (the middle phalanx B2 for the fifth toe) to the anterior parts of the talus B3 and the calcaneus B4. The forefoot portion F of the body portion 34 corresponds to the aforementioned area of the wearer's foot anatomy in the body portion 34 of the upper 3 during the wearing. The forefoot portion F of the body portion 34 is an important portion because it has great influence on the feeling of wearing or the athletic performance of the wearer during the wearing. Therefore, a great effect corresponding to the aforementioned influence can be obtained by reliably conforming the shape of the forefoot portion F of the body portion 34 to the last 4.

The first layer 31 of the fiber sheet 3S in the forefoot portion F has a higher heat shrinkage ratio in the width direction Y (i.e., in a short side direction as viewed in plan view; see FIG. 1) of the upper 3 than in the longitudinal direction X (i.e., in a long side direction as viewed in plan view; see FIG. 1). The longitudinal direction X is a direction in which a virtual line connecting an extreme toe end of the upper 3 and an extreme heel end extends. The width direction Y is a horizontal direction and is a direction orthogonal to the longitudinal direction X.

Here, the surface of the upper 3 in the forefoot portion F has a greater curve in the width direction Y than that in the longitudinal direction X in order to correspond to the shape of the surface of the foot of the wearer. On the other hand, the heat shrinkage ratio of the first layer 31 in the forefoot portion F in the width direction Y is set to be higher than that in the longitudinal direction to provide anisotropic heat shrinkage characteristics, so that the direction (the width direction Y) in which a greater curve is provided can be coincident with the direction in which a higher heat shrinkage ratio is provided. Thus, the forefoot portion F can be easily conformed to the last 4 since it can be more easily conformed to the curve than the forefoot portion having a heat shrinkage ratio set to provide isotropic heat shrinkage characteristics. Specifically, the first layer 31 is set to have a heat shrinkage ratio in the width direction Y of the upper 3 being two times or more of the heat shrinkage ratio in the longitudinal direction X. Here, the second layer 32 is made of nonwoven fabric, and the heat shrinkability is not positively imparted to the fibers that form this nonwoven fabric. Therefore, the second layer 32 integrated as the fiber sheet 3S follows (or is forced to follow) the heat shrinkage of the first layer 31 to be deformed. Same applies to the third layer 33 described later.

When the upper 3 includes the bottom portion 35, it may be configured such that at least a part of the body portion 34 includes the first layer 31 as shown in FIG. 2A, and the bottom portion 35 has a single layer structure without including the first layer 31 as shown in FIG. 2B. That is, the bottom portion 35 may not include the first yarns 3f having a heat shrinkability. This configuration enables the bottom portion 35 to be hardly deformed when the upper 3 is shaped by heating. By configuring the bottom portion 35 to be hardly deformed, the bottom portion 35 can be easily adjusted in position relative to the sole 2. Thus, the sole 2 and the upper 3 can be reliably adhered to each other with accurate positioning therebetween.

Contrary to the above, the bottom portion 35 may include the first layer 31. In this case, a third layer 33 made of nonwoven fabric may be further provided inside the first layer 31 as shown in FIG. 2C. Also, in this case, it is preferable that the first layer 31 and the third layer 33 be integrated by being subjected to the needle punching. With this configuration, the bottom portion 35 is hardly deformed when the upper 3 is shaped by heating.

Next, the description will be made for a method for producing the shoe 1 provided with the upper 3 including the first layer 31 and the second layer 32 layered on the first layer 31. This production method mainly includes a cutting step, an integration step, a first shaping step, a second shaping step, and a sole attaching step. In addition to the above, further steps (e.g., an embroidery step) can be appropriately added.

Figure 7:
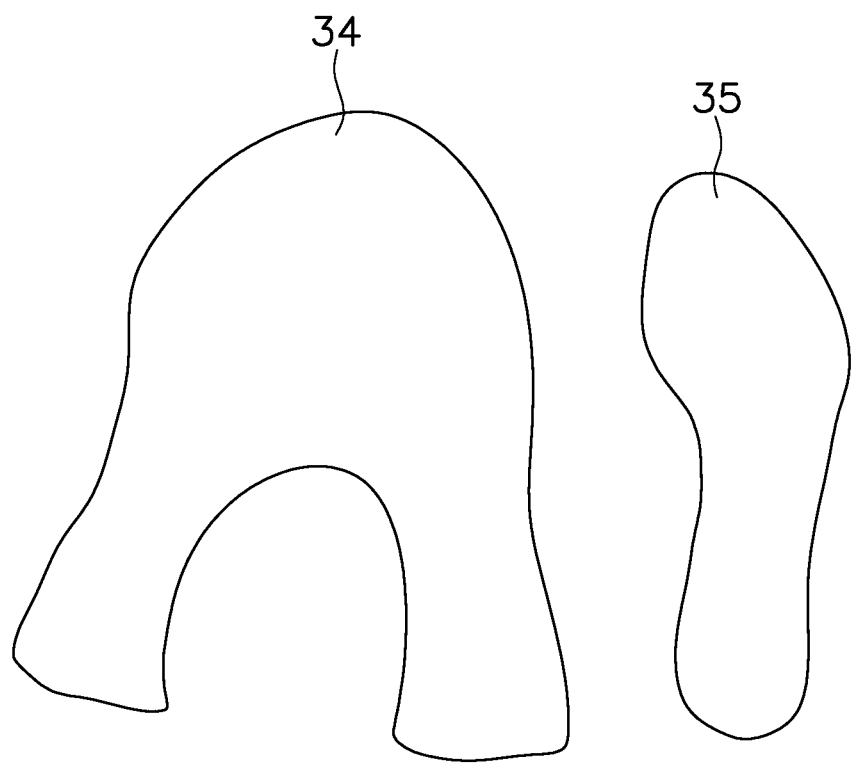
FIG. 7 is a plan view showing the body portion and the bottom portion which are materials of the upper in a state after a cutting process in the first embodiment and the second embodiment.
Figure 8:
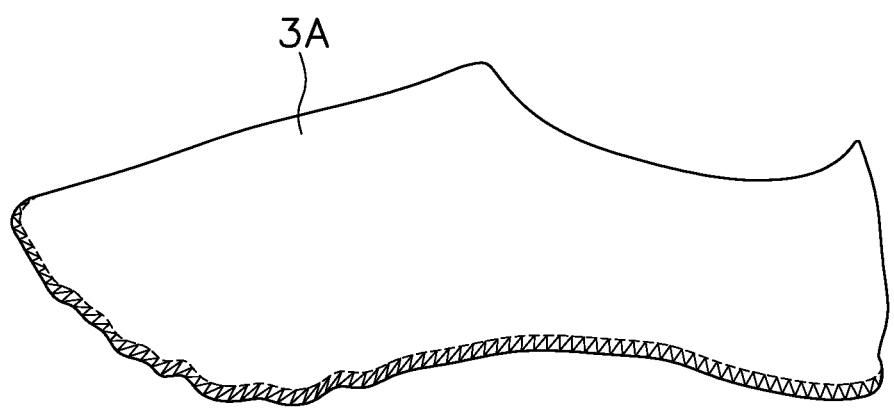
FIG. 8 is a side view showing an unshaped upper with the body portion and the bottom portion sewn together in the first embodiment and the second embodiment.
Figure 9:
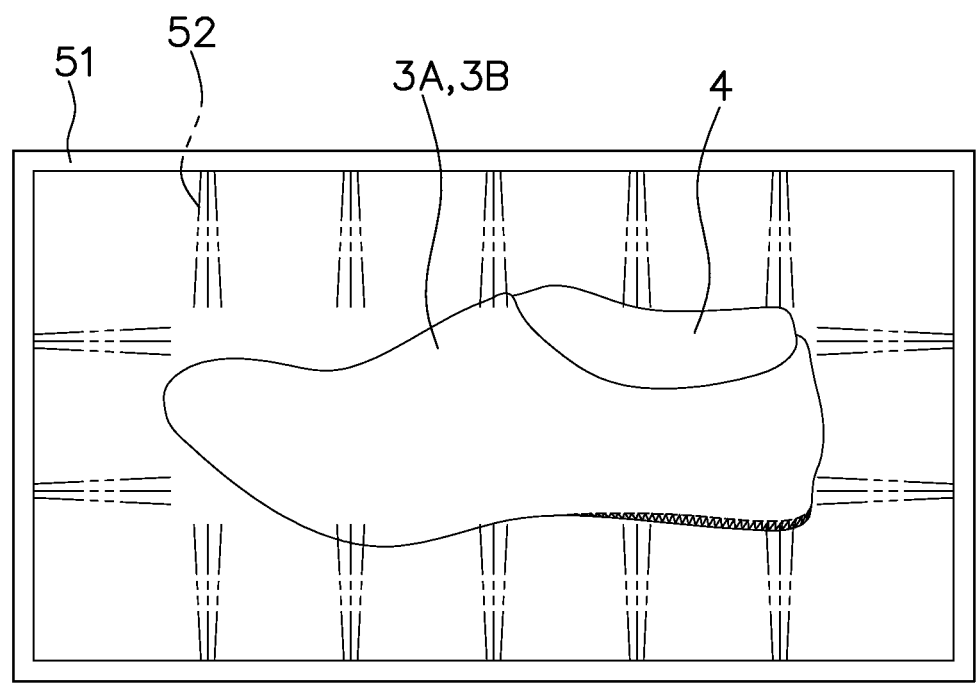
FIG. 9 is a side view showing a state in which the unshaped upper is placed on a last and steam heated in a heating box in the first embodiment and the second embodiment.

In the cutting step, the first layer 31 and the second layer 32 each having a sheet shape are cut into certain sizes and shapes to have the shapes as shown in FIG. 7 in which the body portion 34 and the bottom portion 35 are developed. In the integration step, the first layer 31 and the second layer 32 are layered on each other and subjected to the needle punching to produce the fiber sheet 3S. The order of the cutting step and the integration step is not limited to this and may be reversed. Specifically, the first layer 31 and the second layer 32 may be layered on each other and subjected to the needle punching to thereby produce the fiber sheet 3S, and then the fiber sheet 3S may be cut into a certain size and shape. In the first shaping step, the fiber sheet 3S produced in the integration step is sawn to produce the unshaped upper 3A having a shape corresponding to the upper 3 (see FIG. 8), and the unshaped upper 3A is placed on the last 4 (see FIG. 9). In the second shaping step, the unshaped upper 3A is deformed to conform to the shape of the last 4 by heating from a peripheral area of the unshaped upper 3A, to make a shaped upper 3B (see FIG. 1). The heating temperature and the heating time in the second shaping step can be appropriately set in accordance with the configuration of the unshaped upper 3A. The heating means used in the second shaping step is steam heating. As schematically shown in FIG. 9, for example, the unshaped upper 3A is stored in a heating box 51 and heated by vapor 52 at a high temperature discharged from an inner surface of the heating box 51. The entirety of the unshaped upper 3A can be evenly heated by steam heating. Thus, the unshaped upper 3A can be uniformly deformed to conform to the last 4 to obtain the shaped upper 3B. Other than the steam heating, for example, hot air heating or hot water heating can be employed in the second shaping step. Further, the unshaped upper 3A can be partly heated instead of being heated entirely. In the sole attaching step, the shaped upper 3B is attached to the sole 2 that has been made separately, for example, by adhesion. Other than adhesion, the sole attaching step can be performed simultaneously with the second shaping step by heat fusion, for example.

The shoe 1 is produced by taking a series of the aforementioned steps. Forming a shoe tongue, processing the wearing opening 11, installing eyelets for putting a shoelace (shoestring) therethrough, decorating with ornaments or tags, printing a logo, or attaching an insole (sockliner) may be appropriately performed during any of these steps or after all the steps have been finished. The needle punching can be used for attaching the respective members.

When the unshaped upper 3A includes the body portion 34 located on the upper side and the bottom portion 35 continuous with the lower peripheral end of the body portion 34, the bottom portion 35 can avoid application of heat in the second shaping step. In order not to apply the heat to the bottom portion 35, for example, a jig such as a shield having heat insulating properties, or the last 4 having heat insulating properties on its bottom surface can be used so that the heat reaching the bottom portion 35 can be reduced. Thus, the bottom portion 35 is hardly deformed when it is heated. Therefore, the bottom portion 35 can be precisely adhered to the sole 2 in the adhering step.

Separately from the aforementioned description, when the body portion 34 located on the upper side and the bottom portion 35 continuous with the lower end of the body portion 34 are provided, a bottom portion removing step for removing the bottom portion 35 from the body portion 34 by applying the heat to the bottom portion 35 can be included after the second shaping step. In the bottom portion removing step, the bottom portion 35 having a shape as shown in the right side of FIG. 7 is removed from the body portion 34 to form a through hole (not shown) on the lower side of the shaped upper 3B. The edge of the through hole of the shaped upper 3B subjected to the bottom portion removing step is attached to the sole 2. The unshaped upper 3A is reliably conformed to the shape of the last 4 in the second shaping step, and thereafter the bottom portion 35, which is likely to be hardened by heat shrinking when it is adhered to the sole 2, is removed from the shaped upper 3B. Thereby, the shoe 1 including the sole 2 having an appropriate hardness can be produced with the sole 2 subjected to no influence from the heated bottom portion 35.

Even in the case where the heat is not applied to the bottom portion 35 as described above, the bottom portion 35 may be hardened when the adhesive agent is applied to the bottom portion 35. Thus, the bottom portion removing step may be performed even when the heat is not applied to the bottom portion 35.

According to the production method of this embodiment, the upper 3 is easily conformed to the shape of the last 4 when the upper 3 is shaped in the second shaping step. Thus, the shoe 1 that is conformed to the shape of the last 4 can be produced.

Figure 10:
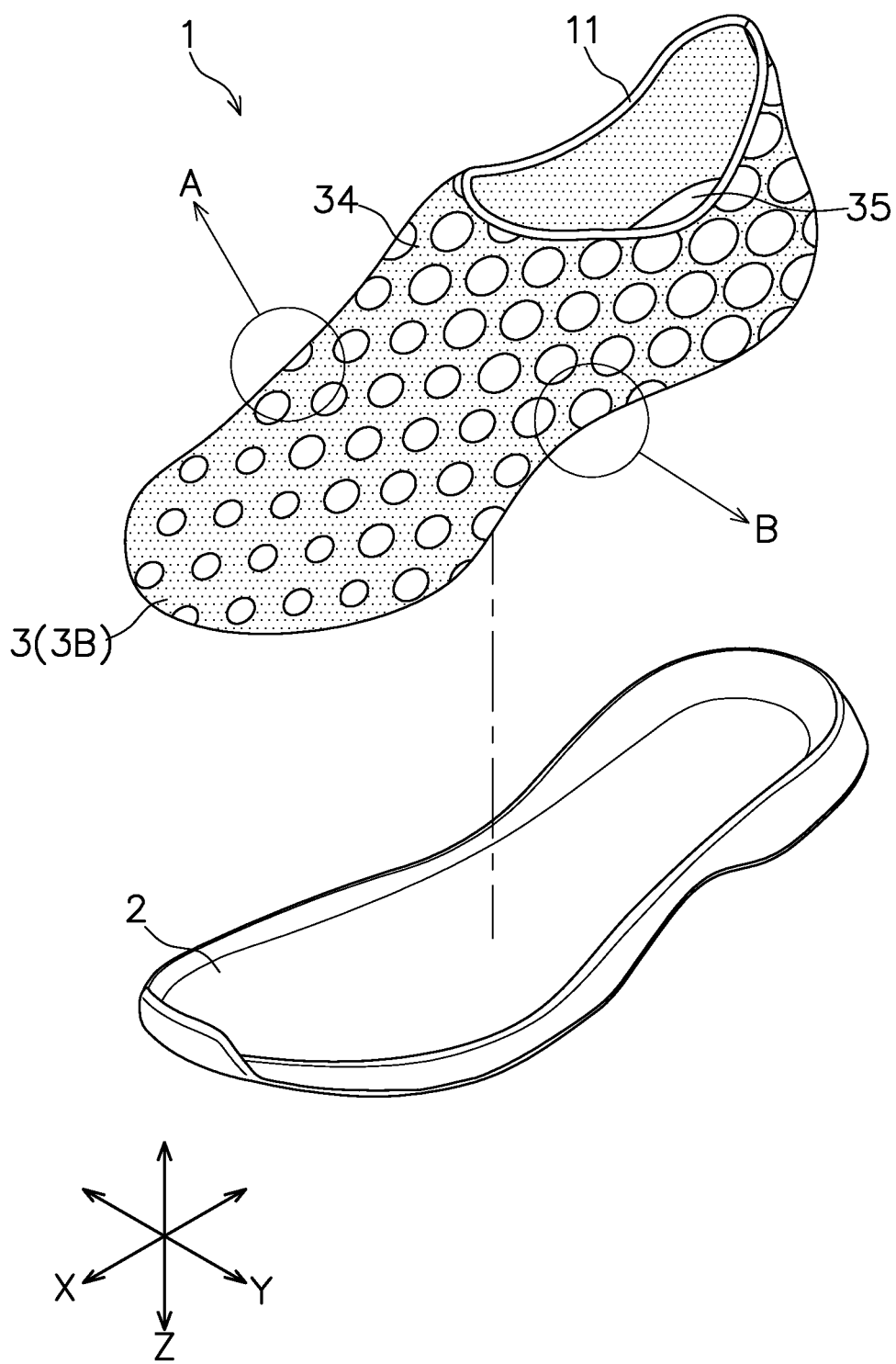
FIG. 10 is an exploded perspective view of a sole and an upper of a shoe according to the second embodiment of the present invention.
Figure 11A:
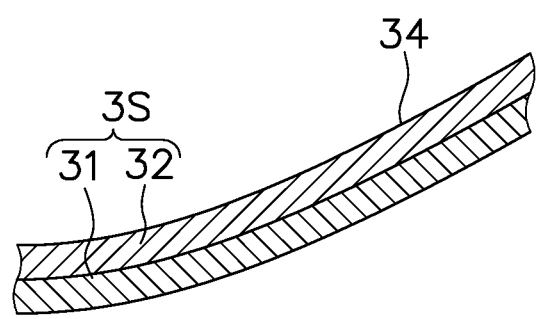
FIG. 11A is a cross-sectional view showing an example of a layer structure of a body portion of the upper in a portion surrounded by circle C in FIG. 10.

Next, the present invention will be described by way of the second embodiment with reference to the drawings. Each of the right and left shoes 1 of this embodiment mainly includes a sole 2 and an upper 3, and the upper 3 is attached to the sole 2 as shown in FIG. 10. The upper 3 has an at least two layer structure, and includes, as shown in FIG. 11A, a first layer 31 having a sheet shape and a second layer 32 having a sheet shape layered on the first layer 31. The upper 3 in the process of the production (before or after the upper 3 is given a shape) may be also referred to as an unshaped upper 3A or a shaped upper 3B for identification of separate state.

The first layer 31 includes yarns 311 having a heat shrinkability. The first layer 31 is made of knitted fabric or woven fabric having inner gaps 312. The second layer 32 is also made of knitted fabric or woven fabric. Unlike the first layer 31, the second layer 32 does not essentially include (but may include) yarns having a heat shrinkability. The second layer 32 made of knitted fabric or woven fabric also includes inner gaps in the same manner as the first layer 31. The knitting method of the knitted fabric is not specifically limited, but may be raschel knitting, tricot knitting, flat knitting, or rib knitting, for example. The weaving method of the woven fabric is not also specifically limited, but may be plain-weaving or twill-weaving, for example.

Each of the yarns 321 forming the second layer 32 preferably has a multifilament structure. The multifilament structure is, for example, a structure in which fine fibers 3211 are assembled to form a yarn as shown in FIG. 13A, and a twist yarn corresponds to such a yarn. When the second layer 32 having a multifilament structure is subjected to the needle punching, the fine fibers 3211 are caught or hooked by the needles N of the needling punching machine (see FIG. 12) and thus are easily entangled with the first layer 31 (specifically, the yarns or fibers that form the first layer 31).

When the needle punching is used from the ornamental point of view, the second layer 32 can be selected to provide an ornament to be combined with the first layer 31 that has a basic ornament. On the other hand, when the needle punching is used from the reinforcement point of view, the second layer 32 can be selected to provide reinforcement to be combined with the first layer 32 that has a basic strength.

Of the upper 3, the first layer 31 is arranged outside the second layer 32 (i.e., on the side far from the foot of the wearer during the wearing, and on the upper side in FIG. 11A). That is, the first layer 31 is an outer layer and the second layer 32 is an inner layer (i.e., the inside and outside relationship in the first embodiment becomes reversed).

Here, the "inner gaps" are spaces each existing between fibers forming the knitted fabric or the woven fabric or between the rows of the fibers such as yarns. Generally, when the fibers of the knitted fabric or the woven fabric are arranged to extend in the plane direction, the inner gaps are spaces extending through in the normal direction of the plane surface or spaces divided in the plane direction. When adjacent intersections of fibers, each intersection having fibers intersecting with each other, are arranged with a distance from each other, each space surrounded by a plurality of intersections of fibers is defined as an inner gap. Meanwhile, when fusible yarns are used as described later, the intersections of fibers after being fused by thermoforming of the upper 3 (the unshaped upper 3A) are brought into a fixed state in which the fibers (the yarns) intersecting with each other are fixed. Examples of the "inner gaps" include openings of a mesh or seam openings of the fabric. In this embodiment, the distance between each two adjacent intersections of fibers is set to be 1 to 5 mm. Alternatively, the gap ratio in the plane direction of the knitted fabric or the woven fabric is set to be 15 to 30%. The inner gaps can be set to satisfy either one of the two conditions.

By providing the inner gaps 312 in the first layer 31, the spaces, that is, the inner gaps 312 absorbs the deformation (the shrinkage) of the yarns 311 having a heat shrinkability and the movement of the intersecting yarns 313 caused by the deformation. Thus, the spaces as the inner gaps 312 do not restrict the deformation of the first layer 31 by the yarns 311 having a heat shrinkability. Therefore, the first layer 31 can be deformed as designed, and thus the conditions (the heating temperature and the heating time) for the heat shrinkage can be easily set.

The yarns 311 having a heat shrinkability included in the first layer 31 may be made of a core-sheath material that is formed by integrating a core 3111 (inner circumference part) with a sheath 3112 (outer circumference part) as schematically shown in FIG. 4A. The yarns 311 are fusible yarns that are fused together by heating, and the core 3111 and the sheath 3112 have different fusion points. The sheath 3112 has a lower fusion point than that of the core 3111 in the yarns 311. Thus, it is possible to shrink the entirety of the yarns 311, while fusing only the sheaths 3112 therein, by heating the unshaped upper 3A when the upper 3 is shaped. Thereby, both of the shape retaining action by the sheath 3112 and the elastic action by the core 3111 can be simultaneously provided. As the yarns 311 having a heat shrinkability, for example, yarns including polyester resin can be used. More specifically, a core-sheath material made of polyester thermoplastic elastomer, or a core-sheath material including the core 3111 made of polyester thermoplastic elastomer and the sheath 3112 made of polyamide thermoplastic elastomer can be used.

The first layer 31 can be formed of woven fabric in which either warps or wefts are the yarns 311 having a heat shrinkability, or knitted fabric in which 10% or more of the entire yarns 311 forming the knitted fabric is composed of the yarns 311 having a heat shrinkability. In the woven fabric, the yarns 311 having a heat shrinkability (warps or wefts) are arranged along the width direction Y of the upper 3 (see FIG. 1). At the time of filing the present application, it is (technically) common that the yarns 311 having a heat shrinkability are used as wefts. FIG. 4B shows a configuration of woven fabric of the first layer 31 in the case where the yarns 311 having a heat shrinkability are used as wefts. According to this configuration, the yarns 311 are shrinked in the longitudinal direction by heating the first layer 31 as shown in FIG. 4C (that is, the shrinkage in the direction represented by the arrows causes the distance between the adjacent two warps 313, 313 to be shortened). The sheaths 3112 of the yarns 311 made of the core-sheath material are fused and fixedly attached to the warps 313 (at fixing points 314 shown as black circles in FIG. 4D). The first layer 31 is thus deformed. By utilizing this deformation, the upper 3 can be appropriately shaped to have a desired shape, specifically, to conform to the shape of the last (shoe last) 4.

Figure 12:
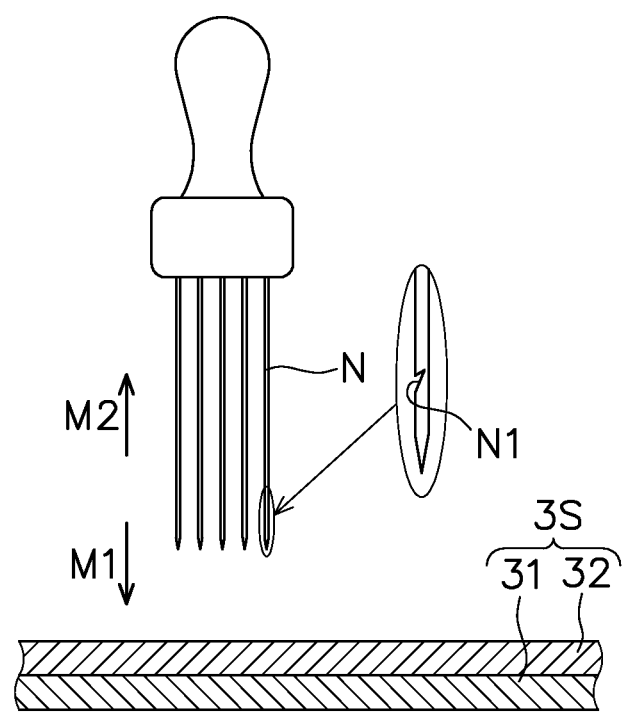
FIG. 12 is a schematic view showing needle punching in the second embodiment.
Figure 13A:
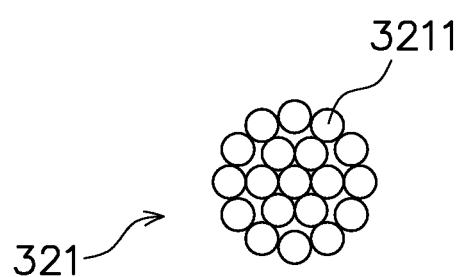
FIG. 13A is an enlarged cross-sectional view of a yarn having a multifilament structure.

As shown in FIG. 12, a needling punching machine having one needle or a plurality of needles is made to reciprocate in the lower direction M1 and the upper direction M2 shown in FIG. 12 to thereby reciprocate the needle or the plurality of needles to repeatedly punch them into the first layer 31 and the second layer 32 in layered state so that the first layer 31 and the second layer 32 are integrated into a fiber sheet 3S. However, the needle punching can be performed using, for example, a sewing machine for embroidery as the needling punching machine. In this case, the needling punching machine may need to include only one needle N. A portion encircled in FIG. 12 shows an enlarged side view of one of the needles N. Each of the needles N has a barb N1 having a triangular groove shape in a side view. However, the shape of the barb N1 is not limited thereto. The shape of the barb N1 in this embodiment allows the needles N to catch or hook the fibers 3211 of the second layer 32, which is a layer located on the nearer side with reference to the needles N in this embodiment, and move the caught or hooked fibers to the first layer 31, which is a layer located on the farther side with reference to the needles N. Thereby, some of the fibers 3211 that form the second layer 32 penetrates through the first layer 31 to be exposed to the surface of the first layer 31 which is the opposite side to the second layer 32. For example, fibers are exposed to the area surrounding dots shown in FIG. 10. The penetration is not necessary, and some of the fibers 3211 may be stayed inside the first layer 31.

Also, the needle punching can be performed by the pulling-out action of the needles N, contrary to the pressing-in action of the needles N of this embodiment. Specifically, the barb N1 in a triangular shape formed in each of the needles N is formed so as to have an upside-down shape of the shape of this embodiment, so that the needles N are allowed to catch or hook the fibers of the layer located on the farther side with reference to the needles N and move the caught or hooked fibers to the layer on the nearer side with reference to the needles N.

The separate layers of the first layer 31 and the second layer 32 are thus integrated to produce the fiber sheet 3S, so that the freedom of ornament for the fiber sheet 3S can be improved by using different colors for the first layer 31 and the second layer 32 to provide color combination, selecting an area to which the needle punching is applied, or the like to, for example, form a dotted pattern on the surface of the first layer 31 as shown in FIG. 10.

When the needle punching is used from the ornamental point of view, the appearance of the first layer 31 and the appearance of the second layer 32 can be differentiated. The "appearance" means the information that can be recognized by the senses of a person who observes the shoe 1 of the wearer, or the like. The senses mainly mean the visual sense, but are not limited to the visual sense. Specifically, examples of the senses include the color, the pattern, or the texture (the hand feeling). The appearance appears on the outer surface or the inner surface of the shoe 1 (for example, the inner surface which can be seen from the wearing opening 11). By using the first layer 31 and the second layer 32 thus different in appearance, the appearance of each of the layers 31, 32 can be changed by the needle punching, and this change can be used as ornament.

The fiber sheet 3S before it is sewn to have a shape of the unshaped upper 3A corresponding to the upper 3 is formed into, for example, a sheet shape or a bag shape. The "bag shape" is a shape having an opening at a position corresponding to the wearing opening 11 of the upper 3 shown in FIG. 10.

The fiber sheet 3S includes the first layer 31 including the yarns 311 having a heat shrinkability, and the first layer 31 includes the inner gaps 312. With this configuration of the fiber sheet 3S, the fiber sheet 3S that forms the upper 3 is easily deformed when it receives the heat at the time of shaping (thermoforming) the upper 3 by heating. Thus, the fiber sheet 3S is easily conformed to the shape (three-dimensional shape) of the last 4. Further, the first layer 31 and the second layer 32 can be securely integrated by the needle punching, which is shown as an example in FIG. 12.

Because the upper 3 can be easily conformed to the shape of the last 4, the upper 3 is given such a shape as to cause a gap relative to the surface of the last on the lateral side of the foot. Thus, the foot of the wearer is less likely to move during the wearing of the shoe and thereby the upper 3 provides excellent holding properties. Further, there is no need to fill the caused gap with stuffing or fitting, and thus the feeling of wearing is good.

Further, since the first layer is arranged outside the second layer 32, the fibers 3211 of the yarns 321 forming the second layer 32 can be exposed to the outer surface of the first layer 31 that is the outer layer by the needle punching. Thus, when the first layer 31 is the outermost layer, the appearance of the first layer 31 can be changed in accordance with the appearance of the second layer 32 by the needle punching.

The description herein is given by taking, for example, the case where the first layer 31 is arranged outside the second layer 32. However, the inside and outside relationship between the layers is not limited thereto and may be reversed. That is, the first layer 31 may be arranged inside the second layer 32 (see the first embodiment). In this case, when the first layer is the innermost layer, the appearance appearing on the inner surface of the first layer 31 can be changed in accordance with the appearance of the second layer 32 by the needle punching. Thus, the inner surface that can be seen from the opening 11 can be ornamented. Further, in this case, the first layer 31 including the yarns 311 having a heat shrinkability is arranged inside the fiber sheet 3S, which is close to the surface of the last 4 when the fiber sheet 3S is placed on the last 4. Thus, when the thermoforming is performed after placing the fiber sheet 3S on the last 4, there is an advantage that the fiber sheet 3S can be more easily conformed to the last 4 since the first layer 31 is located close to the last 4 than the configuration where the first layer 31 is not arranged inside the second layer 32.

Figure 13B:
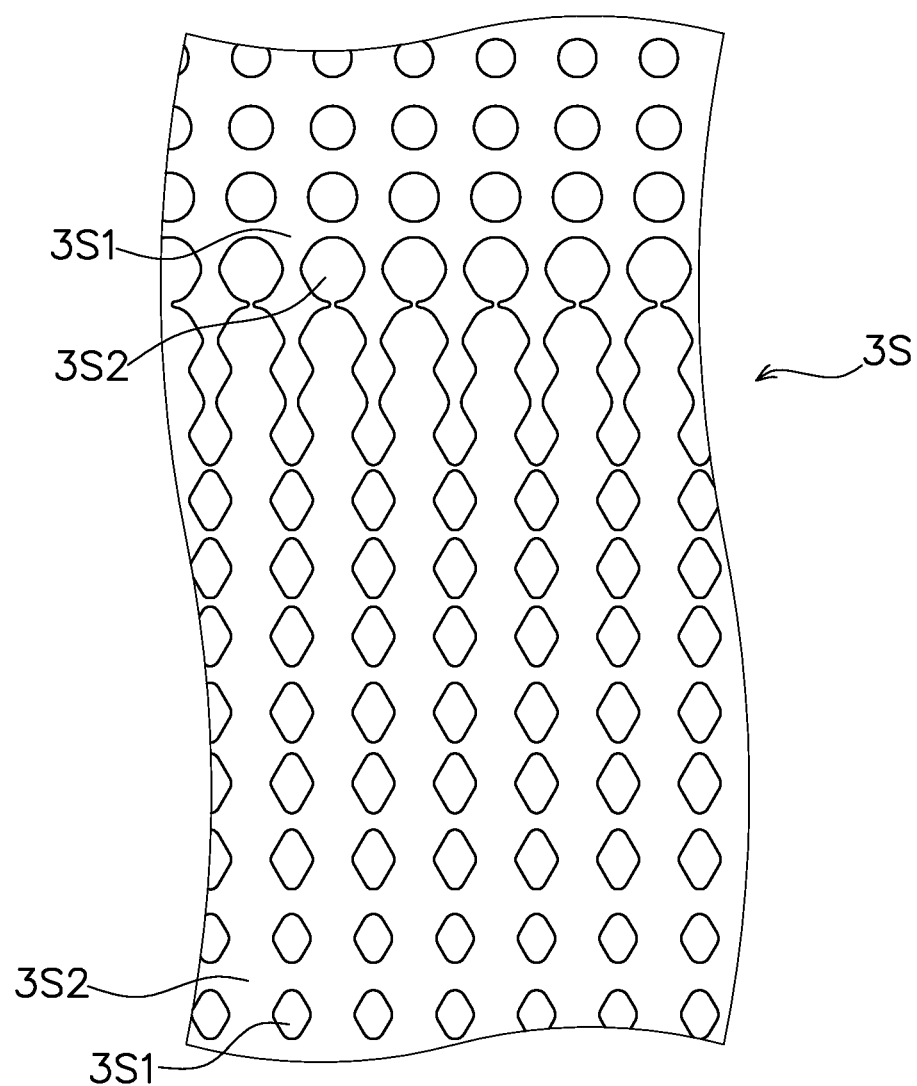
FIG. 13B is a plan view showing an example of a fiber sheet subjected to needle punching.

As shown in FIG. 5B, the fiber sheet 3S can include a needle-punched part 3S1 and a gap forming part 3S2 not subjected to the needle punching (a part indicated by two-dotted chain lines). When the needle punching is performed for ornament, the needle-punched part 3S1 can be formed to have, for example, a pattern as shown in FIG. 13B.

The needle-punched part 3S1 can be arranged in an area of the upper 3 to which ornament is desired to be applied. The needle-punched part 3S1 of this embodiment, which is strengthened by a part (the fibers 3211) of the second layer 32 that bites into the first layer 31, can be arranged in a reinforcement required part of the upper 3 for which strength is required. The reinforcement, which is required herein, is such a degree of strength as to cope with or reduce the force (e.g., a deforming force or a friction force) applied to the shoe 1 during the wearing or at the time of putting on or off. The reinforcement required part is, an area surrounding the thenar or the hypothenar (for preventing wobbling of the foot), the arch (for supporting the arch), the heel (for reinforcement), the wearing opening (for reinforcement), the toe part (for reinforcement), the eyelet portion (for reinforcement), or the adhesion part of the sole (for preventing elongation of the upper). However, without limitation thereto, various areas can be designated as the reinforcement required parts depending on the intended use or the conditions under which the shoe 1 is used.

In the gap forming part 3S2, the first layer 31 and the second layer 32 are not integrated together so that a gap (a space) can be formed between the first layer 31 and the second layer 32. A cushion material (bundle of yarns, cotton, or foam material) or a reinforcement material can be inserted in the gap (the space) of the gap forming part 3S2. The cushion material is inserted through, for example, a position corresponding to the wearing opening or a position corresponding to the shoe tongue of the shoe 1. The reinforcement material is inserted through, for example, a position corresponding to the eyelet portion, a position corresponding to the toe, or a position corresponding to the heel of the shoe 1. Thereby, desired characteristics can be imparted to the gap forming part 3S2. However, nothing can be inserted in the gap forming part 3S2. The characteristics depending on the characteristics of the material to be inserted in the gap forming part 3S2 can be imparted to the fiber sheet 3S. The heat shrinkage amount when the fiber sheet 3S is heated can be adjusted by the material to be inserted. When the reinforcement material is formed of a thermoset resin, the reinforcement material can be formed to conform to the shape of the last 4. Contrarily, in the case where the reinforcement material does not need to be conformed to the last 4, the reinforcement material can be selected from materials that are not deformed at a thermoforming temperature, or the reinforcement material can be inserted in the gap forming part 3S2 after the thermoforming of the upper 3. By thus providing the needle-punched part 3S1 and the gap forming part 3S2 in the fiber sheet 3S, properties to be achieved in each region of the upper 3 can be easily controlled and thus desired properties can be imparted to each region. Further, the properties of the fiber sheet 3S can be adjusted by setting the forming area or the shape of each of the needle-punched part 3S1 and the gap forming part 3S2 in the fiber sheet 3S.

Figure 11B:
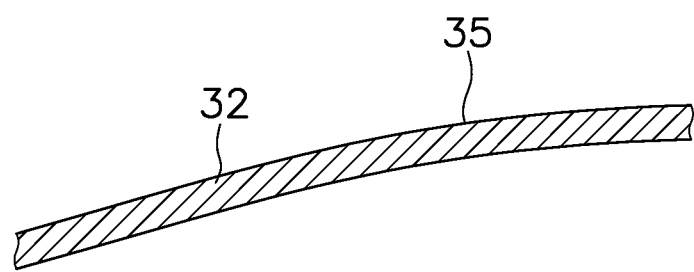
FIG. 11B is a cross-sectional view showing an example of a layer structure of a bottom portion of the upper in a portion surrounded by circle D in FIG. 10.
Figure 11C:
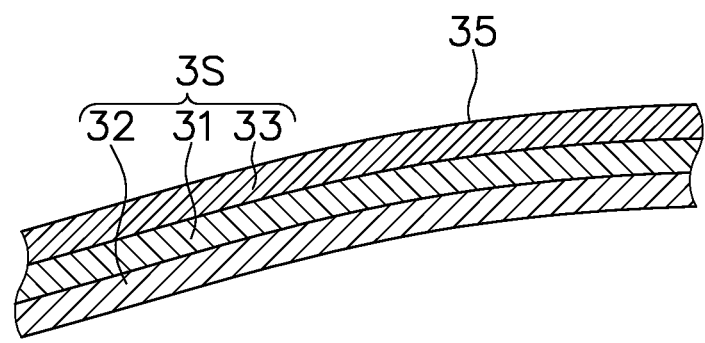
FIG. 11C is a cross-sectional view showing another example of a layer structure of the bottom portion of the upper in a portion corresponding to the portion surrounded by circle D in FIG. 10.

As shown in FIG. 11C, the fiber sheet 3S can have a three layer structure further including a third layer 33 arranged inside the second layer 32. The third layer 33 may be made of any of knitted fabric, woven fabric, and nonwoven fabric. Regarding the third layer 33 in this case, the first layer 31 is subjected to the needle punching to thereby enable integration of the three layers, namely the first layer 31, the second layer 32, and the third layer 33. By thus providing third layer 33, desired properties can be additionally imparted to the produced shoe 1 by setting the material and the layer thickness of the third layer 33. The third layer 33 can be entirely or partly provided on the second layer 32. In the case where the third layer 33 is partly provided, the third layer 33 can be used, for example, to reinforce a peripheral edge of a wearing opening 11 through which the wearer places the foot into and out of the shoe, or to reinforce a part for installing an eyelet.

The upper 3 can include a body portion 34 located on the upper side in the vertical direction Z (see FIG. 10) after the fiber sheet 3S is sewn, and a bottom portion 35 continuous with the lower peripheral end of the body portion 34. The upper 3 can include only the body portion 34, while not including the bottom pat 35. Further, the bottom portion 35 that has been made can be removed later (separated from the body portion 34) as described later.

The fiber sheet 3S can be included in at least a forefoot portion F of the body portion 34. Herein, the "forefoot portion" is intended to be a portion of the human (wearer's) foot anatomy as encircled in FIG. 6, that is, an area from the proximal phalanx B1 of the toes (the middle phalanx B2 for the fifth toe) to the anterior parts of the talus B3 and the calcaneus B4. The forefoot portion F of the body portion 34 corresponds to the aforementioned area of the wearer's foot anatomy in the body portion 34 of the upper 3 during the wearing. The forefoot portion F of the body portion 34 is an important portion because it has great influence on the feeling of wearing or the athletic performance of the wearer during the wearing. Therefore, a great effect corresponding to the aforementioned influence can be obtained by reliably conforming the shape of the forefoot portion F of the body portion 34 to the last 4.

The first layer 31 of the fiber sheet 3S in the forefoot portion F has a higher heat shrinkage ratio in the width direction Y (see FIG. 10) of the upper 3 than in the longitudinal direction X (see FIG. 10). The longitudinal direction X is a direction in which a virtual line connecting an extreme toe end of the upper 3 and an extreme heel end extends. The width direction Y is a horizontal direction and is a direction orthogonal to the longitudinal direction X.

Here, the surface of the upper 3 in the forefoot portion F has a greater curve in the width direction Y than that in the longitudinal direction X in order to correspond to the shape of the surface of the foot of the wearer. On the other hand, the heat shrinkage ratio of the first layer 31 in the forefoot portion F in the width direction Y is set to be higher than that in the longitudinal direction to provide anisotropic heat shrinkage characteristics, so that the direction (the width direction Y) in which a greater curve is provided can be coincident with the direction in which a higher heat shrinkage ratio is provided. Thus, the forefoot portion F can be easily conformed to the last 4 since it can be more easily conformed to the curve than the forefoot portion having a heat shrinkage ratio set to provide isotropic heat shrinkage characteristics. Specifically, the first layer 31 is set to have a heat shrinkage ratio in the width direction Y of the upper 3 being two times or more of the heat shrinkage ratio in the longitudinal direction X. Here, the second layer 32 is made of nonwoven fabric, and the heat shrinkability is not positively imparted to the fibers that form this nonwoven fabric. Therefore, the second layer 32 integrated as the fiber sheet 3S follows (or is forced to follow) the heat shrinkage of the first layer 31 to be deformed. Same applies to the third layer 33 described later.

When the upper 3 includes the bottom portion 35, it may be configured such that at least a part of the body portion 34 includes the first layer 31 as shown in FIG. 11A, and the bottom portion 35 has a single layer structure without including the first layer 31 as shown in FIG. 11B. That is, the bottom portion 35 may not include the first yarns 3f having a heat shrinkability. This configuration enables the bottom portion 35 to be hardly deformed when the upper 3 is shaped by heating. By configuring the bottom portion 35 to be hardly deformed, the bottom portion 35 can be easily adjusted in position relative to the sole 2. Thus, the sole 2 and the upper 3 can be reliably adhered to each other with accurate positioning therebetween.

Contrary to the above, the bottom portion 35 may include the first layer 31. In this case, a third layer 33 made of knitted fabric, woven fabric, or nonwoven fabric may be further provided inside the first layer 31. Also, in this case, it is preferable that the first layer 31 and the third layer 33 be integrated by being subjected to the needle punching. With this configuration, the bottom portion 35 is hardly deformed when the upper 3 is shaped by heating.

Next, the description will be made for a method for producing the shoe 1 provided with the upper 3 including the first layer 31 and the second layer 32 layered on the first layer 31. This production method mainly includes a cutting step, an integration step, a first shaping step, a second shaping step, and a sole attaching step. In addition to the above, further steps (e.g., an embroidery step to be described later) can be appropriately added.

In the cutting step, the first layer 31 and the second layer 32 each having a sheet shape are cut into certain sizes and shapes to have the shapes as shown in FIG. 7 in which the body portion 34 and the bottom portion 35 are developed. In the integration step, the first layer 31 and the second layer 32 are layered on each other and subjected to the needle punching to produce the fiber sheet 3S. The direction in which the needles N are pressed into the first layer 31 and the second layer 32 corresponds to the direction toward the outer layer side from the inner layer side when the first and second layers 31 and 32 are arranged in the produced upper. In this embodiment, the needles N are pressed through the second layer 32 into the first layer 31. Thus, the needle-punched part can be exposed on the first layer 31 that is arranged on the outer layer side, and the needle punching performed by the pressing-in operation makes it hard for, for example, a textile to be lifted up toward the needle N. Thus, the needle punching can be smoothly carried out.

During the needle punching, the position through which the needle N extends into the first layer 31 and the second layer 32 changes every moment. That is, the position through which the needle N extends shifts in the plane direction of the first layer 31 and the second layer 32 from the first pressing-in position to the subsequent pressing-in position. The direction in which the position changes every moment is constant in the plane direction of the first layer 31 and the second layer 32 from the start position to the end position in the area to be subjected to the needle punching. For example, when the position through which the needles N extends changes in the horizontal direction in plan view, the position always shifts rightward during the position changes from the left end to the right end in the area to be subjected to the needle punching, and the position always shifts leftward during the position changes from the right end to the left end, without interruption of shifting in a different direction. In the case where the position through which the needle N extends changes in the vertical direction in plan view, the position which changes from the upper end to the lower end in the area to be subjected to the needle punching always shifts downward, and the position changes from the lower end to the upper end always shifts upward, without interruption of shifting in a different direction. Thus, the direction in which the position shifts change to a different direction only after the needles N shifts from the start position to the end position in the area to be subjected to the needle punching, and does not change during the shifting of the position from the start position to the end position. This configuration prevents the fiber sheet 3S from having an uneven strength and thus enables the fiber sheet 3S to have stable strength in comparison with the case where the position through which the needle N extends irregularly changes in the plane direction.

The order of the cutting step and the integration step is not limited to this and may be reversed. Specifically, the first layer 31 and the second layer 32 may be layered on each other and subjected to the needle punching to thereby produce the fiber sheet 3S, and then the fiber sheet 3S may be cut into a certain size and shape.

Before the integration step, an embroidery step of embroidering the fiber sheet 3S can be included. Without limitation thereto, the embroidery step can be performed after the integration step. The fiber sheet 3S can be highly ornamented or reinforced by embroidery yarns used for the embroidery as compared with the case where the fiber sheet 3S is subjected only to the needle punching. An embroidered area may be entirely or partly coincident with an area which will be or has been subjected to the needle punching (i.e., the needle-punched part 3S1) as shown in FIG. 13B, for example. Further, an embroidered area may be formed in a completely different area. When the embroidered area is entirely or partly coincident with the area which will be subjected to the needle punching, additional ornament by the needle punching can be applied to the ornament formed by embroidery. This is advantageous in terms of improving the ornamental effects.

In the first shaping step, the fiber sheet 3S produced in the integration step is sawn to produce the unshaped upper 3A having a shape corresponding to the upper 3 (see FIG. 8), and the unshaped upper 3A is placed on the last 4 (see FIG. 9). In the second shaping step, the unshaped upper 3A is deformed to conform to the shape of the last 4 by heating from a peripheral area of the unshaped upper 3A, to make a shaped upper 3B (see FIG. 10). The heating temperature and the heating time in the second shaping step can be appropriately set in accordance with the configuration of the unshaped upper 3A. The heating means used in the second shaping step is steam heating. As schematically shown in FIG. 9, for example, the unshaped upper 3A is stored in a heating box 51 and heated by vapor 52 at a high temperature discharged from an inner surface of the heating box 51. The entirety of the unshaped upper 3A can be evenly heated by steam heating. Thus, the unshaped upper 3A can be uniformly deformed to conform to the last 4 to obtain the shaped upper 3B. Other than the steam heating, for example, hot air heating or hot water heating can be employed in the second shaping step. Further, the unshaped upper 3A can be partly heated instead of being heated entirely. In the sole attaching step, the shaped upper 3B is attached to the sole 2 that has been made separately, for example, by adhesion.

Other than adhesion, the sole attaching step can be performed simultaneously with the second shaping step by heat fusion, for example.

The shoe 1 is produced by taking a series of the aforementioned steps. Forming a shoe tongue, processing the wearing opening 11, installing eyelets for putting a shoelace (shoestring) therethrough, decorating with ornaments or tags, printing a logo, or attaching an insole (sockliner) may be appropriately performed during any of these steps or after all the steps have been finished.

When the unshaped upper 3A includes the body portion 34 located on the upper side and the bottom portion 35 continuous with the lower peripheral end of the body portion 34, the bottom portion 35 can avoid application of heat in the second shaping step. In order not to apply the heat to the bottom portion 35, for example, a jig such as a shield having heat insulating properties, or the last 4 having heat insulating properties on its bottom surface can be used so that the heat reaching the bottom portion 35 can be reduced. Thus, the bottom portion 35 is hardly deformed when it is heated. Therefore, the bottom portion 35 can be precisely adhered to the sole 2 in the adhering step.

Separately from the aforementioned description, when the body portion 34 located on the upper side and the bottom portion 35 continuous with the lower peripheral end of the body portion 34 are provided, a bottom portion removing step for removing the bottom portion 35 from the body portion 34 by applying the heat to the bottom portion 35 can be included after the second shaping step. In the bottom portion removing step, the bottom portion 35 having a shape as shown in the right side of FIG. 7 is removed from the body portion 34 to form a through hole (not shown) on the lower side of the shaped upper 3B. The edge of the through hole of the shaped upper 3B subjected to the bottom portion removing step is attached to the sole 2. The unshaped upper 3A is reliably conformed to the shape of the last 4 in the second shaping step, and thereafter the bottom portion 35, which is likely to be hardened by heat shrinking when it is adhered to the sole 2, is removed from the shaped upper 3B. Thereby, the shoe 1 including the sole 2 having an appropriate hardness can be produced with the sole 2 subjected to no influence from the heated bottom portion 35.

Even in the case where the heat is not applied to the bottom portion 35 as described above, the bottom portion 35 may be hardened when the adhesive agent is applied to the bottom portion 35. Thus, the bottom portion removing step may be performed even when the heat is not applied to the bottom portion 35.

According to the production method of this embodiment, the upper 3 is easily conformed to the shape of the last 4 when the upper 3 is shaped in the second shaping step. Thus, the shoe 1 that is conformed to the shape of the last 4 can be produced.

Hereinafter, the configurations according to the first embodiment of the present application and effects produced thereby will be summarized. The shoe 1 of this embodiment includes an upper 3 made of a fiber sheet 3S that includes: a first layer 31 made of knitted fabric or woven fabric, the knitted fabric or woven fabric including yarns 311 having a heat shrinkability and inner gaps 312; and a second layer 32 layered on the first layer 31 and made of nonwoven fabric, and being integrated with the first layer by needle punching.

According to this configuration, the fiber sheet 3S includes the first layer 31 including the yarns having a heat shrinkability, and the first layer 31 has the inner gaps 312, so that the upper 3 can be easily conformed to the shape of the last since the fiber sheet 3S forming the upper 3 is easily deformed when the upper 3 is shaped by heating.

The first layer 31 may be arranged inside the second layer 32.

According to this configuration, the first layer 31 including the yarns having a heat shrinkability is located on the inner side, which is close to the surface of the last 4, so that the fiber sheet 3S can be easily conformed to the last 4 when the fiber sheet 3S is placed on the last 4.

It may be configured such that the fiber sheet 3S further includes a third layer 33 made of nonwoven fabric, and arranged inside the first layer 31, and the first layer 31 and the third layer 33 are integrated by the needle punching.

According to this configuration, the third layer 33 thus provided enables to impart desired properties to the shoe 1.

It may be configured such that the upper 3 includes a body portion 34 located on an upper side and a bottom portion 35 continuous with a lower end of the body portion34, the body portion 34 has a forefoot portion F, the fiber sheet 3S is included in at least the forefoot portion F, and the first layer 31 has a higher heat shrinkage ratio in a width direction Y of the upper 3 than in a longitudinal direction X of the upper 3.

According to this configuration, the forefoot portion F of the body portion 34 can be easily conformed to the last 4.

It may be configured such that at least of a part of the body portion 34 includes the first layer 31, and the bottom portion 35 does not include the first layer 31.

According to this configuration, the bottom portion 35 is hardly deformed when the upper 3 is shaped by heating.

It may be configured such that the bottom portion 35 further includes a third layer 33 made of nonwoven fabric and arranged inside the first layer31, and the first layer 31 and the third layer 33 are integrated by the needle punching.

According to this configuration, the bottom portion 35 is hardly deformed when the upper 3 is shaped by heating.

It may be configured such that the yarns 311 having the heat shrinkability included in the first layer 31 are made of a core-sheath material, and the first layer 31 is formed of woven fabric in which either warps or wefts are the yarns having the heat shrinkability, or knitted fabric in which 10% or more of the entire yarns 311 forming the knitted fabric have the heat shrinkability.

According to this configuration, it is possible to appropriately shape the upper 3 by heating.

The fiber sheet 3S may include a needle-punched part 3S1 and a gap forming part 3S2 not subjected to the needle punching.

According to this configuration, desired properties can be imparted to each portion of the upper 3.

The method of this embodiment is a method for producing a shoe including an upper that includes: a first layer 31 made of knitted fabric or woven fabric, the knitted fabric or woven fabric including yarns 311 having a heat shrinkability and inner gaps 312; and a second layer 32 layered on the first layer and made of nonwoven fabric, the method including: cutting the first layer 31 and the second layer 32 into a certain size; making the first layer 31 and the second layer 32 overlap one another and performing needle punching on the first layer 31 and the second layer 32 to form a fiber sheet 3S; preparing an unshaped upper 3A by sewing the fiber sheet 3S to have a shape corresponding to the upper 3, and placing the unshaped upper 3A on a last 4; and deforming the unshaped upper to conform the unshaped upper to a shape of the last by heating to thereby produce a shaped upper 3B.

According to the method having this configuration, the shoe 1 that is conformed to the shape of the last can be produced.

The heating means may be performed by steam heating.

According to the method having this configuration, the entirety of the unshaped upper 3A can be evenly heated.

The method may be configured such that the unshaped upper 3A includes a body portion 34 located on an upper side, and a bottom portion 35 continuous with a lower end of the body portion 34, and the bottom portion 35 is not applied with heat in the deforming.

According to the method having this configuration, the bottom portion 35 is hardly deformed when heated, and thus the bottom portion 35 is reliably adhered to the sole 2 with accurate positioning therebetween.

The method may be configured such that the unshaped upper 34 includes a body portion 34 located on an upper side and a bottom portion 35 continuous with a lower end of the body portion 35, the bottom portion 35 is applied with heat in the deforming, and the method further includes removing the bottom portion 35 from the body portion 34 after the deforming.

According to the method having this configuration, the shoe including the sole 2 having an appropriate hardness can be produced by conforming the unshaped upper 3A to the shape of the last 4 in the second shaping step, and thereafter removing the bottom portion 35, which may be hardened by heating when adhered to the sole 2, from the body portion 34.

Next, the configurations according to the second embodiment of the present application and effects produced thereby will be summarized. The shoe 1 includes an upper 3 made of a fiber sheet 3S that includes: a first layer 31 made of knitted fabric or woven fabric that includes yarns 311 having a heat shrinkability and has inner gaps 312; and a second layer 32 layered on the first layer 31 and made of knitted fabric or woven fabric, the first layer 31 and the second layer 32 being integrated by needle punching to produce the fiber sheet 3S.

According to this configuration, the fiber sheet 3S includes the first layer 31 including the yarns having a heat shrinkability and the first layer 31 has the inner gaps 312. Thus, the fiber sheet 3S forming the upper 3 is easily deformed so that the upper 3 can be easily conformed to the shape of the last 4, when the upper 3 is shaped by heating.

Each of the yarns forming the second layer 32 may have a multifilament structure.

According to this configuration, the fibers 3211 can be easily entangled with the first layer 31.

The needle-punched part 3S1 may be arranged on a reinforcement required part required to have a strength in the fiber sheet 3S.

According to this configuration, a reinforcement required part required to have a strength can be reinforced by the fiber sheet 3S subjected to the needle punching.

The first layer 31 can be arranged outside the second layer 32.

According to this configuration, the fibers 3211 of the yarns 321 forming the second layer 32 can be exposed to the outer surface of the first layer 31 that is the outer layer by the needle punching. Thus, when the first layer 31 is the outermost layer, the appearance of the first layer 31 can be changed in accordance with the appearance of the second layer 32 by the needle punching.

It may be configured such that the upper 3 includes a body portion 34 located on an upper side and a bottom portion 35 continuous with a lower peripheral end of the body portion 34, the body portion 34 has a forefoot portion F, the fiber sheet 3S is included in at least the forefoot portion F, and the first layer 31 has a higher heat shrinkage ratio in a width direction Y of the upper 3 than in a longitudinal direction X of the upper 3.

According to this configuration, the forefoot portion F of the upper 3 can be easily conformed to the last 4.

It may be configured such that the yarns 311 having a heat shrinkability included in the first layer 31 are made of a core-sheath material, and the first layer 31 is formed of woven fabric in which either warps or wefts are the yarns having a heat shrinkability, or knitted fabric in which 10% or more of the entire yarns 311 forming the knitted fabric have a heat shrinkability.

According to this configuration, it is possible to appropriately shape the upper 3 by heating.

The fiber sheet 3S may include a needle-punched part 3S1 and a gap forming part 3S2 not subjected to the needle punching.

According to this configuration, desired properties can be imparted to each portion of the upper 3.

The method of this embodiment is a method for producing a shoe upper including: integrating a first layer 31 and a second layer 32, the first layer 31 being made of knitted fabric or woven fabric, the knitted fabric or woven fabric including yarns 311 having a heat shrinkability and inner gaps 312, the second layer 32 being layered on the first layer 31 and made of knitted fabric or woven fabric, the integrating including making the first layer 31 and the second layer 32 overlap one another; and performing needle punching on the first layer 31 and the second layer 32 that overlap one another, to produce a fiber sheet 3S, wherein a needle N used for the needle punching is pressed into the first layer 31 and the second layer 32 in a direction extending from one of the first layer 31 and the second layer 32, which is inwardly arranged, to an other of the first layer 31 and the second layer 32, which is outwardly arranged, to produce the shoe upper 3.

According to the method having this configuration, the needle-punched part can be exposed on the first layer 31 that is arranged on the outer layer side, and the needle punching performed by the pressing-in operation can be smoothly carried out.

It may be configured such that a position through which the needle N extends into the first layer 31 and the second layer 32 changes during the needle punching in a direction which is constant in a plane direction of the first layer 31 and the second layer 32 from a start position to an end position in an area to be subjected to the needle punching.

According to this configuration, the strength of the fiber sheet 3S is stabilized in comparison with the case where the position through which the needles N extends irregularly changes in the plane direction.

The method may further include embroidering the fiber sheet before or after the integrating.

According to this configuration, the produced shoe upper can be highly ornamented or reinforced by the embroidery.

During the embroidering, the fiber sheet subjected to the needle punching in the integrating can be embroidered.

According to this configuration, a pattern formed by the embroidery can be further ornamented by the needle punching.

This embodiment is also directed to a method for producing a shoe including: preparing a unshaped upper 3A by sewing the fiber sheet 3S to have a shape corresponding to the upper 3 produced by the shoe upper producing method according to any of the above mentioned methods, and placing the unshaped upper 3A on a last 4; and deforming the unshaped upper 3A to conform the unshaped upper to a shape of the last 4 by heating to produce a shaped upper 3B.

According to the method having this configuration, the shoe 1 that is conformed to the shape of the last 4 can be produced.

The present invention is described above by way of two embodiments, but the foregoing description is merely an example. The shoe 1, the method for producing the shoe 1, and the method for producing the shoe upper 3 according to the present invention are not limited to the aforementioned embodiments. Thus, the shoe 1, the method for producing the shoe 1, and the method for producing the shoe upper 3 according to the present invention can be subjected to various modifications within the gist of the present invention. Such modifications include, for example, replacement of a part or omission of a part of a plurality of elements constituting the aforementioned embodiments, or appropriate combination of elements belonging to the separate examples. Further, the matters belonging to the common technical knowledge in relation to the shoe 1, the method for producing the shoe 1, or the method for producing the shoe upper 3 are also included.

The shoe, the method for producing a shoe and the method for producing a shoe upper of the embodiments are as described above. However, the present invention is not limited to the aforementioned embodiments, and the design can be appropriately modified within the scope intended by the present invention. The operational advantage of the present invention is also not limited to the foregoing embodiments. The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope to the claims.

What is claimed is:

1. A shoe comprising:
an upper made of a fiber sheet that comprises:
a first layer made of knitted fabric or woven fabric, the knitted fabric or woven fabric comprising yarns having a heat shrinkability and inner gaps; and
a second layer layered on the first layer and made of nonwoven fabric, knitted fabric or woven fabric, and being integrated with the first layer by needle punching; wherein
the upper comprises a body portion located on an upper side and a bottom portion continuous with a lower peripheral end of the body portion,
the second layer does not comprise yarns having a heat shrinkability, and
the bottom portion consists of the second layer and does not include the first layer.

2. The shoe according to claim 1, wherein
the first layer is arranged inside the second layer.

3. The shoe according to claim 2, wherein
the fiber sheet further comprises a third layer made of nonwoven fabric, knitted fabric or woven fabric, and arranged inside the first layer, and
the first layer and the third layer are integrated by the needle punching.

4. The shoe according to claim 1, wherein
the upper comprises a body portion located on an upper side and a bottom portion continuous with a lower end of the body portion,
the body portion has a forefoot portion,
the fiber sheet is comprised in at least the forefoot portion, and
the first layer has a higher heat shrinkage ratio in a width direction of the upper than in a longitudinal direction of the upper.

5. The shoe according to claim 4, wherein
at least of a part of the body portion comprises the first layer, and the bottom portion does not comprise the first layer.

6. The shoe according to claim 4, wherein
the bottom portion further comprises a third layer made of nonwoven fabric, knitted fabric or woven fabric and arranged inside the first layer, and
the first layer and the third layer are integrated by the needle punching.

7. The shoe according to claim 1, wherein
the yarns having the heat shrinkability comprised in the first layer are made of a core-sheath material, and
the first layer is formed of woven fabric in which either warps or wefts are the yarns having the heat shrinkability, or knitted fabric in which 10% or more of the entire yarns forming the knitted fabric have the heat shrinkability.

8. The shoe according to claim 1, wherein
yarns that form the second layer have a multifilament structure.

9. The shoe according to claim 1, wherein
in the fiber sheet, the needle-punched part is arranged on a reinforcement required part to allow the reinforcement required part to have a strength in the upper.

10. The shoe according to claim 1, wherein
the first layer is arranged outside the second layer.

* * * * *